US010772298B1

(12) United States Patent
Mullin

(10) Patent No.: US 10,772,298 B1
(45) Date of Patent: Sep. 15, 2020

(54) MULTI-SKILL LEVEL ANIMAL-OPERATED PUZZLE AND TREAT TOY

(71) Applicant: Make Ideas, LLC, La Jolla, CA (US)

(72) Inventor: Keith Alan Mullin, La Jolla, CA (US)

(73) Assignee: MAKE IDEAS, LLC, La Jolla, CA (US)

( * ) Notice: Subject to any disclaimer, the term of this patent is extended or adjusted under 35 U.S.C. 154(b) by 174 days.

(21) Appl. No.: 15/585,108

(22) Filed: May 2, 2017

Related U.S. Application Data

(60) Provisional application No. 62/330,549, filed on May 2, 2016.

(51) Int. Cl.
*A01K 15/02* (2006.01)
*A01K 5/01* (2006.01)
*A01K 5/02* (2006.01)

(52) U.S. Cl.
CPC .......... *A01K 15/025* (2013.01); *A01K 5/0114* (2013.01); *A01K 5/0275* (2013.01)

(58) Field of Classification Search
CPC .. A01K 15/025; A01K 15/026; A01K 5/0114; A01K 5/0135; A01K 5/0275
USPC ................................ 119/707, 709, 710, 711
See application file for complete search history.

(56) References Cited

U.S. PATENT DOCUMENTS

| 1,006,182 | A | 10/1911 | Cousin |
| 1,022,112 | A | 4/1912 | Smith |
| 1,031,095 | A | 7/1912 | Smith |
| 1,534,964 | A | 4/1925 | Kahnweiler |
| 2,086,631 | A | 7/1937 | Munro |
| 3,830,202 | A | 8/1974 | Garrison |
| 4,907,537 | A | 3/1990 | Shirk |
| RE34,352 | E | 8/1993 | Markham |
| 5,367,986 | A | 11/1994 | O'Rourke et al. |
| 5,553,570 | A | 9/1996 | VanNatter, III et al. |

(Continued)

FOREIGN PATENT DOCUMENTS

GB          2253329 A       9/1992

OTHER PUBLICATIONS

"Busy Buddy" by Petsafe. <https://web.archive.org/web/20131017005029/https://www.petsafe.net/b . . . >, accessed Oct. 17, 2013, (9 pages).

(Continued)

*Primary Examiner* — Tien Q Dinh
*Assistant Examiner* — Brady W Frazier
(74) *Attorney, Agent, or Firm* — Tillman Wright, PLLC; James D. Wright; David R. Higgins

(57) ABSTRACT

An animal-operated puzzle and treat toy, includes a body that includes a storage portion defining a treat cavity and a manipulator element connected to the body. The manipulator element is adjustable relative to the body to produce an access opening, to the treat cavity, that is large enough such that a food treat or other reward item may be released through the access opening to the environment. In an initial state, the manipulator element blocks the food treat or other reward item from being released from the treat cavity, and in an adjusted state, the manipulator element has been adjusted, relative to the body, such that the access opening is produced. A plurality of different possible initial states are provided to correspond to different levels of difficulty required to produce the access opening.

20 Claims, 16 Drawing Sheets

(56) References Cited

U.S. PATENT DOCUMENTS

| | | | |
|---|---|---|---|
| 5,595,142 A | 1/1997 | Chill | |
| 5,647,302 A | 7/1997 | Shipp | |
| 5,709,165 A * | 1/1998 | Nurmikko | A01K 15/025 119/51.01 |
| 5,792,470 A | 8/1998 | Baumgardner, Sr. | |
| 5,799,616 A | 9/1998 | McClung, III | |
| 5,819,690 A | 10/1998 | Brown | |
| 5,832,877 A | 11/1998 | Markham | |
| 5,853,757 A | 12/1998 | Durand et al. | |
| 5,865,146 A | 2/1999 | Markham | |
| 5,895,662 A | 4/1999 | Meyer | |
| 5,965,182 A | 10/1999 | Lindgren | |
| 6,050,224 A | 4/2000 | Owens | |
| D431,886 S | 10/2000 | Owens | |
| D432,741 S | 10/2000 | Owens | |
| 6,148,771 A | 11/2000 | Costello | |
| 6,186,096 B1 | 2/2001 | Miller | |
| 6,217,408 B1 | 4/2001 | Willinger | |
| 6,237,538 B1 | 5/2001 | Tsengas | |
| 6,405,681 B1 | 6/2002 | Ward | |
| 6,415,741 B2 | 7/2002 | Suchowski et al. | |
| 6,427,634 B1 | 8/2002 | Mann | |
| 6,439,166 B1 | 8/2002 | Markham | |
| 6,484,671 B2 | 11/2002 | Herrenbruck | |
| 6,526,912 B1 | 3/2003 | Ottoson | |
| 6,601,539 B1 | 8/2003 | Snook | |
| 6,609,944 B1 | 8/2003 | Viola | |
| 6,623,328 B1 | 9/2003 | Theel | |
| 6,634,318 B1 | 10/2003 | Rucker | |
| 6,681,721 B1 | 1/2004 | Buschy | |
| 6,688,258 B1 | 2/2004 | Kolesar | |
| 6,840,197 B1 | 1/2005 | Trompke | |
| D505,233 S | 5/2005 | Viola | |
| 6,899,059 B1 | 5/2005 | Crane et al. | |
| D513,816 S | 1/2006 | Crane et al. | |
| 6,990,762 B1 | 1/2006 | Muday et al. | |
| 7,144,293 B2 | 12/2006 | Mann et al. | |
| 7,389,748 B2 | 6/2008 | Shatoff et al. | |
| 7,426,903 B2 | 9/2008 | Simon | |
| 7,600,488 B2 | 10/2009 | Mann | |
| 7,644,684 B2 | 1/2010 | Ritchey | |
| 7,762,214 B2 | 7/2010 | Ritchey | |
| D626,706 S | 11/2010 | Ragonetti | |
| 7,823,542 B2 | 11/2010 | Freeman | |
| 8,225,747 B2 | 7/2012 | Markham et al. | |
| 8,231,920 B2 | 7/2012 | Axelrod et al. | |
| 8,240,273 B2 * | 8/2012 | Benson | A01K 15/025 119/51.01 |
| 8,413,612 B2 | 4/2013 | Smith | |
| 8,464,666 B2 | 6/2013 | Chefetz et al. | |
| 8,474,404 B2 | 7/2013 | Costello | |
| 8,479,687 B2 | 7/2013 | Anderson et al. | |
| D688,012 S | 8/2013 | Canello et al. | |
| 8,522,725 B1 | 9/2013 | Moore | |
| 8,640,647 B2 | 2/2014 | Dotterer | |
| D710,554 S | 8/2014 | Byrne | |
| 8,875,662 B2 | 11/2014 | Angle et al. | |
| 8,904,966 B2 | 12/2014 | Kolozsvari et al. | |
| D721,210 S | 1/2015 | Diskin | |
| 8,935,992 B2 | 1/2015 | Axelrod et al. | |
| 9,027,512 B2 | 5/2015 | Prange et al. | |
| 9,107,390 B1 | 8/2015 | Day | |
| 9,498,433 B1 | 11/2016 | Mullin et al. | |
| 10,582,696 B1 | 3/2020 | Mullin | |
| 2002/0139708 A1 | 10/2002 | Lien | |
| 2003/0079693 A1 | 5/2003 | Jager | |
| 2004/0244719 A1 | 12/2004 | Jager | |
| 2005/0045115 A1 | 3/2005 | Mann | |
| 2006/0060154 A1 | 3/2006 | Wesely | |
| 2006/0260560 A1 | 11/2006 | Renforth et al. | |
| 2007/0068464 A1 * | 3/2007 | Smith | A01K 15/025 119/709 |
| 2007/0261644 A1 * | 11/2007 | Simon | A01K 15/025 119/707 |
| 2008/0083378 A1 * | 4/2008 | Pearce | A01K 5/0114 119/707 |
| 2009/0050073 A1 * | 2/2009 | Simon | A01K 15/025 119/708 |
| 2009/0078214 A1 | 3/2009 | Mann | |
| 2009/0314221 A1 * | 12/2009 | Wang | A01K 15/025 119/707 |
| 2010/0224138 A1 | 9/2010 | Axelrod et al. | |
| 2011/0256208 A1 | 10/2011 | Ling | |
| 2012/0012068 A1 * | 1/2012 | Costello | A01K 15/025 119/707 |
| 2012/0111284 A1 | 5/2012 | Berger | |
| 2013/0036988 A1 | 2/2013 | Lai | |
| 2013/0047932 A1 | 2/2013 | Salmon Hyder et al. | |
| 2013/0092097 A1 | 4/2013 | Cooper | |
| 2013/0142936 A1 | 6/2013 | Stern et al. | |
| 2014/0202396 A1 | 7/2014 | Hansen | |
| 2014/0345532 A1 | 11/2014 | Valle | |
| 2015/0164047 A1 | 6/2015 | Watts et al. | |
| 2015/0237829 A1 | 8/2015 | Tsengas | |
| 2015/0373950 A1 | 12/2015 | Spring | |
| 2016/0037751 A1 | 2/2016 | Byrne | |
| 2016/0113243 A1 | 4/2016 | Mullin et al. | |
| 2016/0316719 A1 * | 11/2016 | Parness | A01K 15/025 |
| 2018/0263214 A1 | 9/2018 | McMillan et al. | |
| 2019/0133082 A1 | 5/2019 | Becattini, Jr. et al. | |

OTHER PUBLICATIONS

"PetSafe Busy Buddy Kibble Nibble Meal Dispensing Dog Toy". Amazon.com: Customer reviews: PetSafe Busy Buddy Kibble Nibble Meal Dispensing Dog Toy. <https://www.amazon.com/product-reviews/B001F0RRUA/ref=cm_cr_ge>, accessed Nov. 15, 2008, (3 pages).

"PetSafe SlimCat Interactive Feeder". PetSafe Brand Official Website, <https://store.petsafe.net/slimcat-interactive-feeder>, accessed Mar. 11, 2020, (1 page).

Nina Ottosson—Pet activity toys & treat puzzle games, <https://web.archive.org/web/20110209120033/http://www.nina-ottosson . . . >, accessed Jan. 25, 2018, (2 pages).

"Planet Dog Mazee" YouTube video, Sep. 12, 2012.

"Ethical 5785 Seek-A-Treat Discovery Wheel Dispensing Puzzle", Amazon.com: Customer reviews: Ethical 5785 Seek-A-Treat Discovery Wheel Dispensing Puzzle, <https://www.amazon.com/Ethical-5785-Treat-Discovery-Dispensing/pro>, accessed Jan. 25, 2018, (3 pages).

* cited by examiner

426

US 10,772,298 B1

MULTI-SKILL LEVEL ANIMAL-OPERATED PUZZLE AND TREAT TOY

CROSS-REFERENCE TO RELATED APPLICATION

The present application is a U.S. nonprovisional patent application of, and claims priority under 35 U.S.C. § 119(e) to, U.S. provisional patent application Ser. No. 62/330,549 filed May 2, 2016, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to animal toys, and, more particularly, to multi-skill level animal-operated puzzles and treat toys that animals can play with in order to earn rewards while learning.

Background

Animal toys have been in use for decades. Typically, animal toys, including dog toys, cat toys, and other pet toys, are comprised of materials such as rubber, plush, TPE (thermoplastic elastomer), and/or the like, or edible materials. They may be in the form of a bone, animal, or the like. Some are solid and some are hollow. While these devices may be suitable for the particular purpose to which they address, they are not suitable as puzzle toys that animals can play in a way that rewards them while learning.

In this regard, one major problem with conventional animal toys, such as rubber bones, is they to do not have the ability to hold and retain food items or treats such that the treats do not fall out easily. Another problem with conventional animal toys is they do not have two or more adjustable skill levels or variable apertures. Another problem with conventional animal toys is they do not have shapes or mechanisms which can be manipulated to change the skill or ability level of the product. Another problem with conventional animal toys is they do not have puzzle manipulators which are used by the animal or dog to solve the puzzle. Another problem with conventional animal toys is they do not provide a problem solving puzzle where treats are dispensed when the puzzle is solved.

SUMMARY OF THE PRESENT INVENTION

Broadly defined, the present invention according to one aspect is an animal-operated puzzle and treat toy, including: a body that includes a storage portion defining a treat cavity; and a manipulator element connected to the body that is adjustable relative to the body to produce an access opening, to the treat cavity, that is large enough such that a food treat or other reward item may be released through the access opening to the environment; wherein, in an initial state, the manipulator element blocks the food treat or other reward item from being released from the treat cavity; and wherein, in an adjusted state, the manipulator element has been adjusted, relative to the body, such that the access opening is produced.

In a feature of this aspect, a food treat or other reward item disposed within the treat cavity.

In another feature of this aspect, the manipulator element is connected to the body such that the manipulator element may be translated relative to the body to produce the access opening. In further features, the body includes an aperture penetrating through to the treat cavity, and translation of the manipulator element relative to the body exposes the aperture, thereby producing the access opening by fluidly connecting the treat cavity through the aperture to the environment; the aperture is a first aperture, the manipulator element includes a second aperture, and translation of the manipulator element relative to the body aligns the second aperture with the first aperture, thereby producing the access opening by fluidly connecting the treat cavity through the first and second apertures to the environment; the manipulator element further includes an additional aperture defining a third aperture, the third aperture is larger than the second aperture, and the first aperture may alternatively be aligned with the second aperture or the third aperture to change the level of difficulty required in producing the access opening; the body further includes an additional aperture defining a third aperture, the third aperture is larger than the first aperture, and the second aperture may alternatively be aligned with the first aperture or the third aperture to change the level of difficulty required in producing the access opening; the body and the manipulator element are arranged such that different amounts of translation may be required from the initial state in order to expose the aperture and thereby to produce the access opening, thereby changing the level of difficulty required in producing the access opening; the storage portion is a first storage portion, the treat cavity is a first treat cavity, and the aperture is a first aperture, the body includes a second storage portion defining a second treat cavity and includes a second aperture penetrating through to the second treat cavity, the second treat cavity is separate from the first treat cavity, and a different amount of translation of the manipulator element relative to the body is required to expose the second aperture as is required to expose the first aperture; the first aperture is of a different size than the second aperture, thereby changing the level of difficulty required in producing the access opening; in the initial state, the manipulator element blocks the aperture, and in the adjusted state, the manipulator element does not block the aperture; the manipulator element is connected to the body such that the manipulator element may be translated laterally relative to the body to produce the access opening; the manipulator element is an elongated manipulator element that extends into the body such that an end of the elongated manipulator element protrudes from a side of the body, and the end of the elongated manipulator element may be translated away from the body to produce the access opening; the body is cube-shaped; the end of the elongated manipulator element is a first end, the elongated manipulator element includes a second end opposite the first end, and the second end protrudes from an opposite side of the body; the body is an elongated body, and the manipulator element is connected to the body such that the manipulator element may be translated along a length of the elongated body to produce the access opening; the body has a circular cross-section; the body has a cross-section in the form of a polygon; the manipulator element is retained on the body such that the manipulator element can be translated relative to the body by an animal but cannot be removed from body by the animal; the body has a circular cross-section, the manipulator element has a circular interior, and the manipulator element is connected to the body such that the manipulator element may be rotated around the circular body to produce the access opening; and/or the manipulator element is generally spherical in shape.

In another feature of this aspect, the manipulator element is permanently or semi-permanently attached to the body, and the manipulator element includes deflectable elements that may be adjusted to produce the access opening. In further features, the deflectable elements are biased such that in a deflected state, an aperture sufficiently large to permit food treats or other items in the treat cavity is created to form the access opening and such that in a non-deflected state, the aperture shrinks such that the food treats or other items in the treat cavity are prevented from passing therethrough; and/or the deflectable elements are flexible pleats.

In another feature of this aspect, the manipulator element includes projections extending upward from the surface thereof to facilitate gripping between an animal's teeth and/or paws. In further features, the projections include knobs; the projections include elongate handles or grasping members extending away from the surface of the manipulator element; the projections include clusters of structures defining dimples therebetween, the dimples being sized to receive an animal tooth such that the edges of structures clean the tooth when received in one of the dimples; and/or the structures of the clusters of structures are comprised of a plurality of stacked disks.

In another feature of this aspect, a method of using the puzzle and treat toy of includes: filling the treat cavity with at least one food treat or other reward item; adjusting the manipulator element to place the manipulator element in the initial state; and providing the puzzle and treat toy to an animal to entice the animal to adjust the manipulator element, relative to the body, to produce the access opening and thereby to cause the release of the food treat or other reward item therethrough. In features, the method further includes a step of choosing, from a plurality of different possible initial states, a particular desired initial state, and the step of adjusting the manipulator element includes adjusting the manipulator element to place the manipulator element in the chosen initial state; and/or the plurality of different possible initial states correspond to different levels of difficulty required to produce the access opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
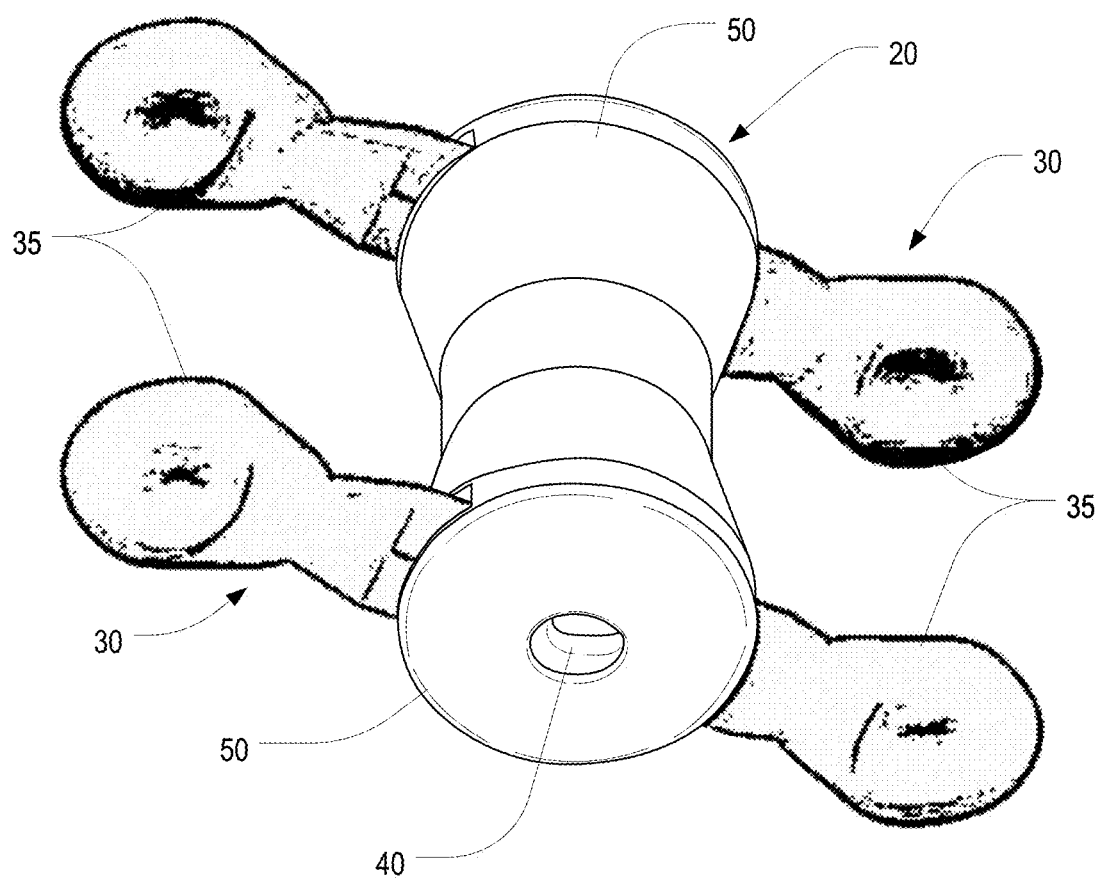
FIG. 1 is a perspective view of a multi-skill level animal-operated puzzle and treat toy in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1 is a perspective view of a multi-skill level animal-operated puzzle and treat toy 10 in accordance with a first preferred embodiment of the present invention. As shown therein, the multi-skill level animal-operated puzzle and treat toy 10 includes a body 20 and one or more manipulator elements 30. In general, the body 20 is commonly the main structural component of the toy 10. The body 20 contains or supports the other parts (i.e., the manipulator elements 30) of the toy 10. As a foundation or structural frame, the body 20, can have multiple manipulator elements 30 permanently or semi permanently attached to it. The body 20 includes one or more apertures 40, one or more storage portions 50 containing treat cavities, and may include a lid (not shown).

Figure 2:
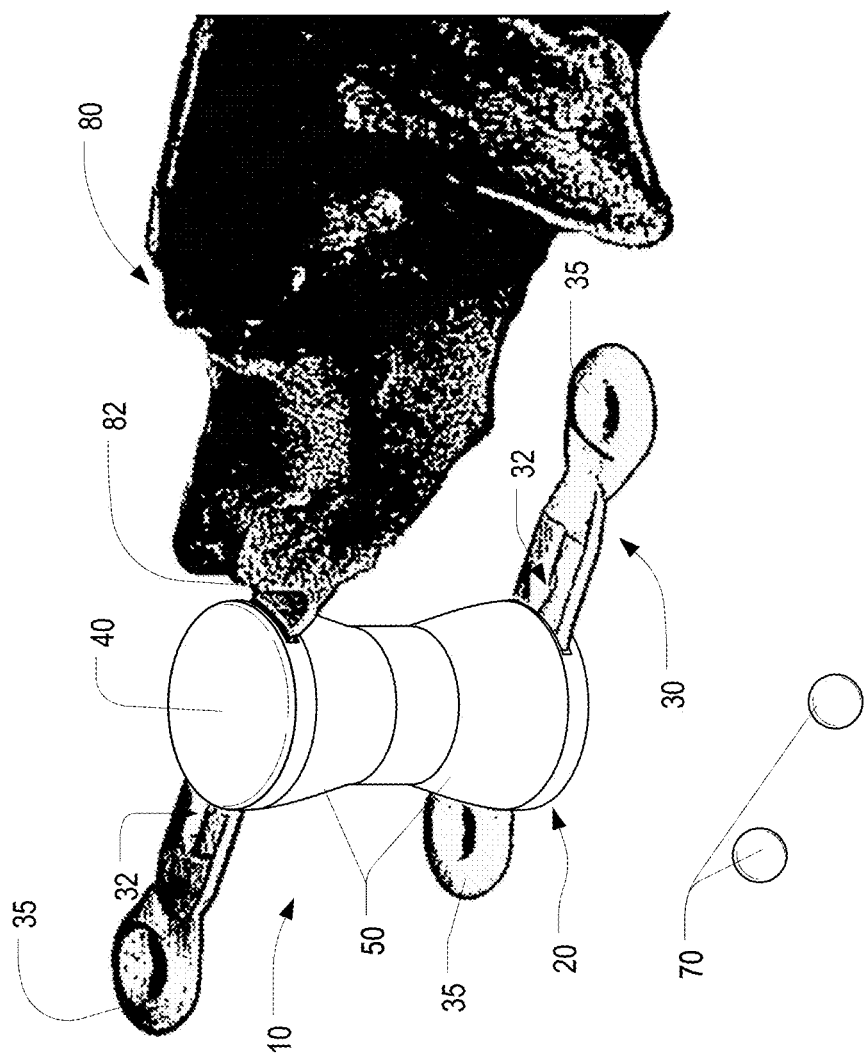
FIG. 2 is a perspective view of a dog using the puzzle and treat toy of FIG. 1.

In general, each treat cavity is an open space within a storage portion 50 of the body 20 which can be used as a container. In the embodiment of FIGS. 1 and 2, two storage portions 50 are provided, one in each half of the toy 10, with each containing a treat cavity. In at least some embodiments, the walls of each treat cavity are created or defined by the surrounding body 20. Each treat cavity can be filled with food treats 70 or other reward items for the animal 80. In some embodiments, the storage portion 50 may have a lid (not shown) to aid in the filing process, while in some embodiments, the storage portion 50 is filled through one of the apertures 40. Each treat cavity may hold food and/or various other items, matter, or substances which are placed therein. Typically, the items placed inside the treat cavity are items which an animal 80 would like to access, possess, consume, or the like, such as food treats 70 or other reward items. In some embodiments, a storage portion 50 can have smooth internal surfaces. In some embodiments, a storage portion 50 may have internal surfaces with ridges or grooves which additionally retain food treats 70 or other reward items. Each storage portion 50 can be of any shape suitable for holding or containing items stated herein. When there is more than one storage portion 50, as shown in FIGS. 1 and 2, it may be useful or necessary to have one or more additional apertures 40 and/or manipulator elements 30 to access each treat cavity.

The aperture 40 is a hole or port in the body 20 which, when properly aligned with a manipulator element 30 (such as a corresponding aperture 32) allows access to the treat cavity 50 and/or the interior of the body 20. In the embodiment of FIGS. 1 and 2, the access opening created when the aperture 40 and the manipulator 30 are lined up allows one or more food treat 70 or other reward item to pass through and/or be released or poured out of the storage portion 50. The aperture 40 also may allow an animal 80 to access the interior of the body 20 and/or a treat cavity directly to obtain a food treat 70 or other reward item which may be contained in the treat cavity.

Figure 3:
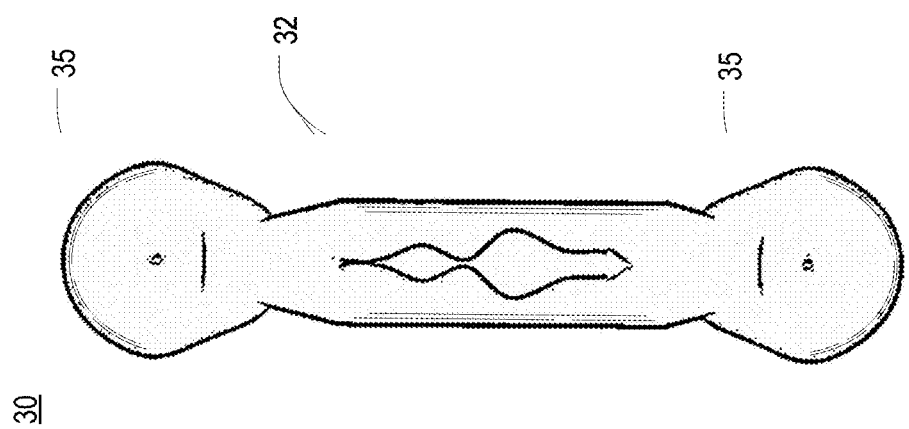
FIG. 3 is a top view of one of the manipulator elements of the puzzle and treat toy of FIG. 1.

FIG. 3 is a top view of one of the manipulator elements 30 of the puzzle and treat toy 10 of FIG. 1. In general, the manipulator elements 30 are the components which the animal uses to solve the puzzle. The manipulator has a handle or grasping member 35 that can be easily used by an animal 80 via mouth and/or teeth 82 and/or using its paws 85. With regard to the former, FIG. 2 is a perspective view of a dog using the puzzle and treat toy 10 of FIG. 1. As shown therein, the dog 80 is manipulating the linear element 30 of the puzzle and treat toy 10 of FIG. 1.

In some embodiments, a manipulator element 30 may also adjust the diameter or area of the access opening created by the alignment of the aperture 40 and the aperture 32 of the manipulator element 30. In such embodiments, the manipulator element 30, when moved by the animal 80, changes the size of one or both apertures 32,40 and/or selects a different size aperture 32,40, thereby changing the size of the access opening that allows access to the treat cavity. For example, in the embodiment of FIG. 3, movement of the manipulator 30 by the animal 80 either blocks the aperture 40 in the body 20 of the puzzle and treat toy 10 or aligns the aperture 40 with the larger or smaller aperture 32 of the manipulator element 30, thereby increasing or decreasing the size of the access opening used to access the treat cavity.

Figure 4:
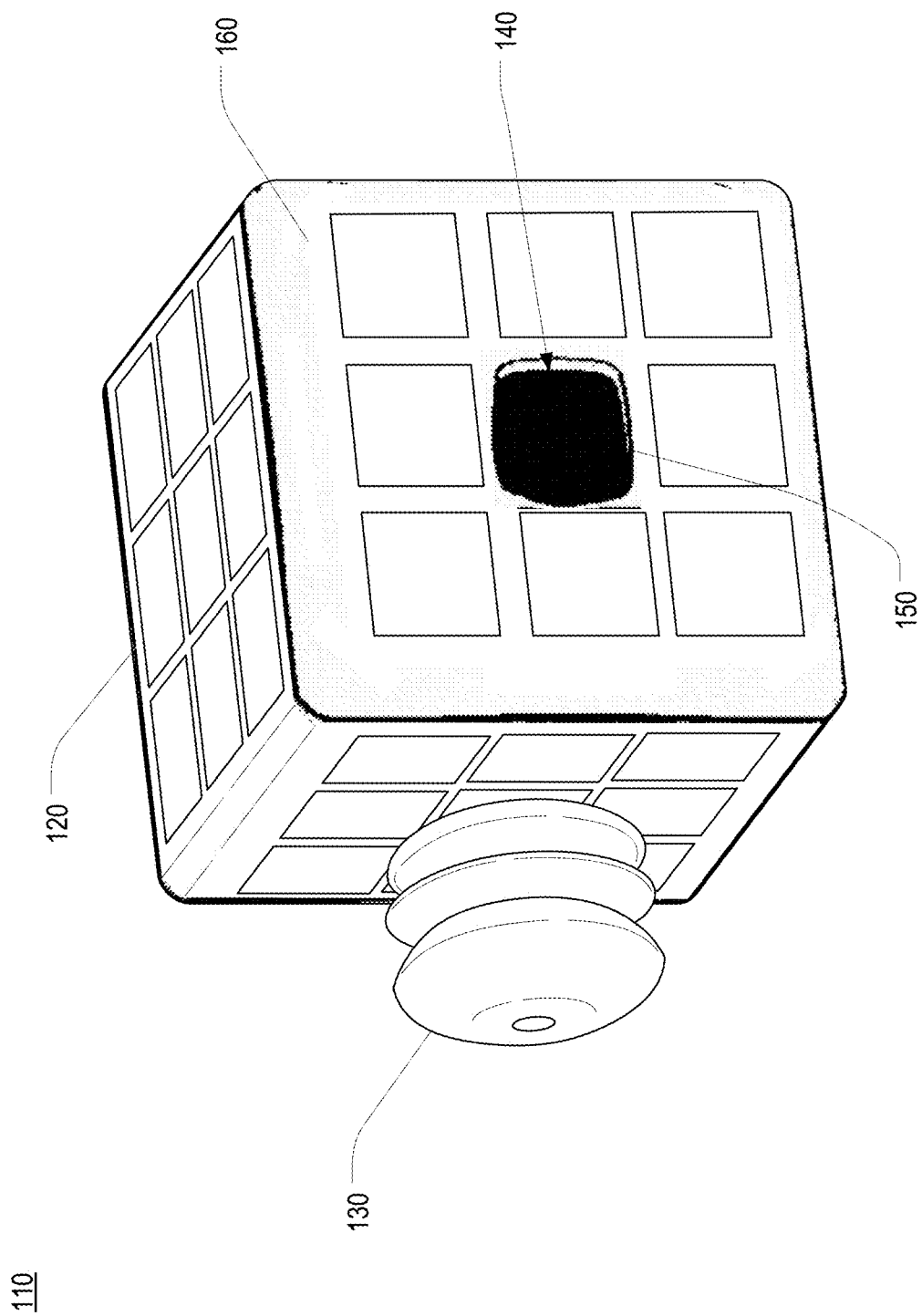
FIG. 4 is a perspective view of a cube-shaped animal-operated puzzle and treat toy in accordance with a second preferred embodiment of the present invention.
Figures 5, 6:
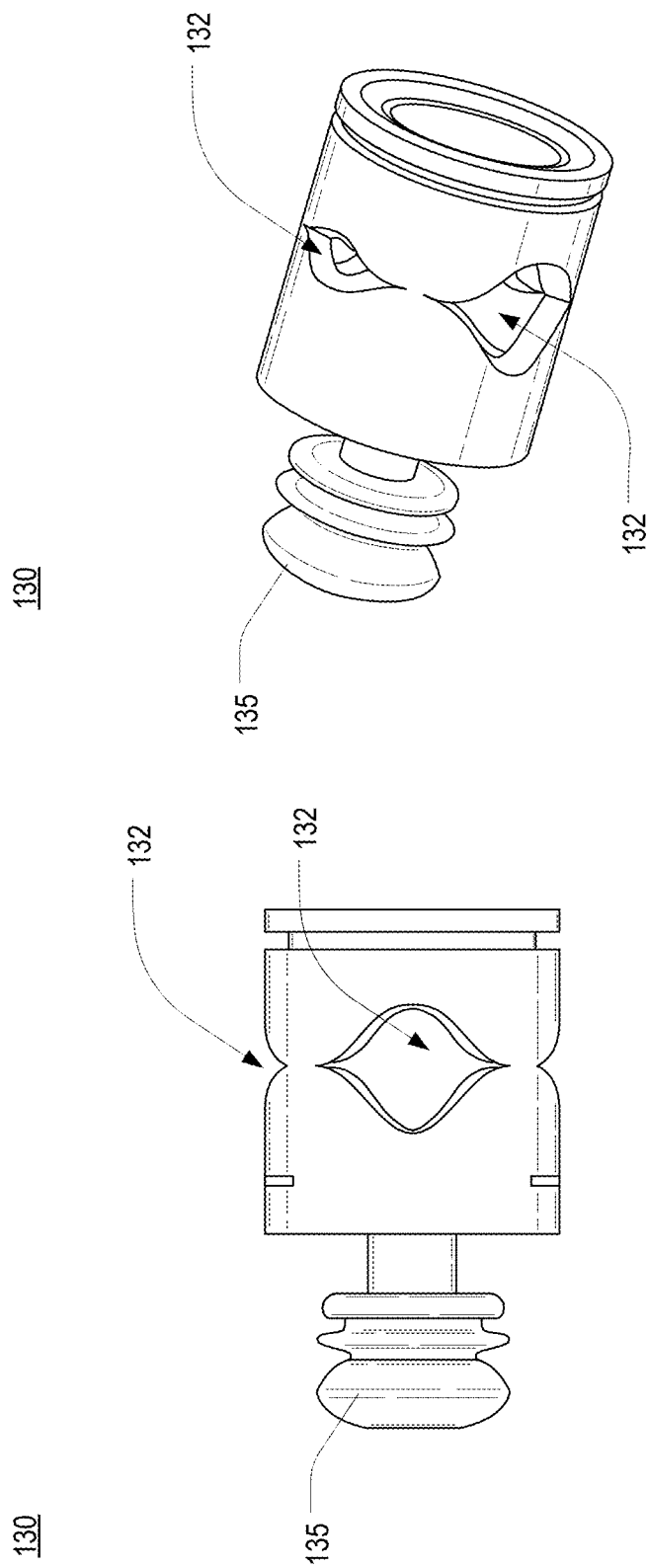
FIG. 5 is a side view of the cylindrical manipulator element of the cube-shaped animal-operated puzzle and treat toy of FIG. 4.
FIG. 6 is a perspective view of the cylinder manipulator element of the cube-shaped animal-operated puzzle and treat toy of FIG. 4.
Figure 7:
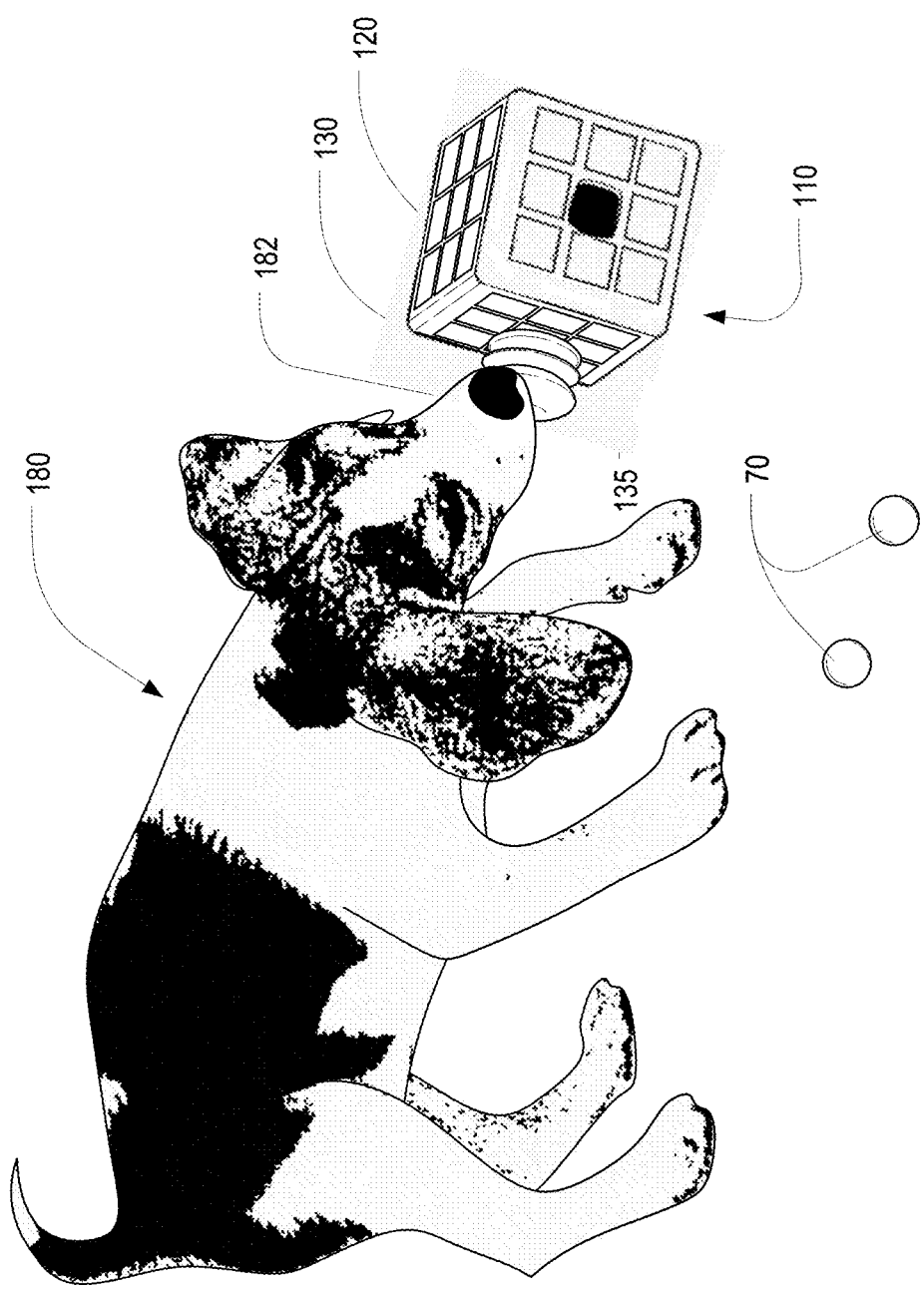
FIG. 7 is an illustration of an animal manipulating the cylindrical manipulator element of the cube-shaped, animal-operated puzzle and treat toy of FIG. 4.

FIG. 4 is a perspective view of a cube-shaped animal-operated puzzle and treat toy 110 in accordance with a second preferred embodiment of the present invention. As shown therein, the multi-skill level animal-operated puzzle and treat toy 110 includes a body 120 and a cylindrical manipulator element 130. The body 120 includes an aperture 140, one or more storage portions 150 containing treat cavities, and may include a lid 160. FIGS. 5 and 6 are a side view and a perspective view, respectively, of the cylindrical manipulator element 130 of the cube-shaped animal-operated puzzle and treat toy 110 of FIG. 4. As shown therein, a handle or grasping member 135 at the external end of the manipulator element 130 may be manipulated by an animal 80 to align an aperture 132 therein with the aperture 140 of the body 120. In this regard, FIG. 7 is an illustration of an animal 180 manipulating the cylindrical manipulator element 130 of the cube-shaped, animal-operated puzzle and treat toy 110 of FIG. 4.

Figure 8:
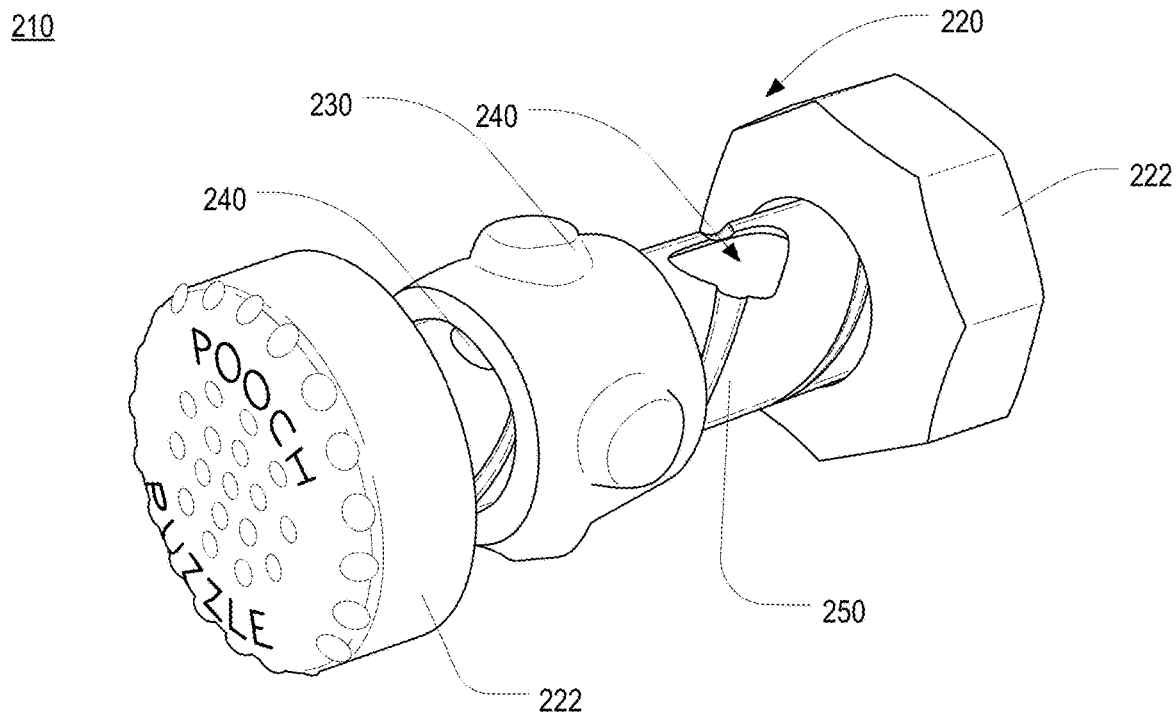
FIG. 8 is a perspective view of a multi-skill barbell-shaped animal-operated puzzle and treat toy in accordance with a third preferred embodiment of the present invention.
Figure 9:
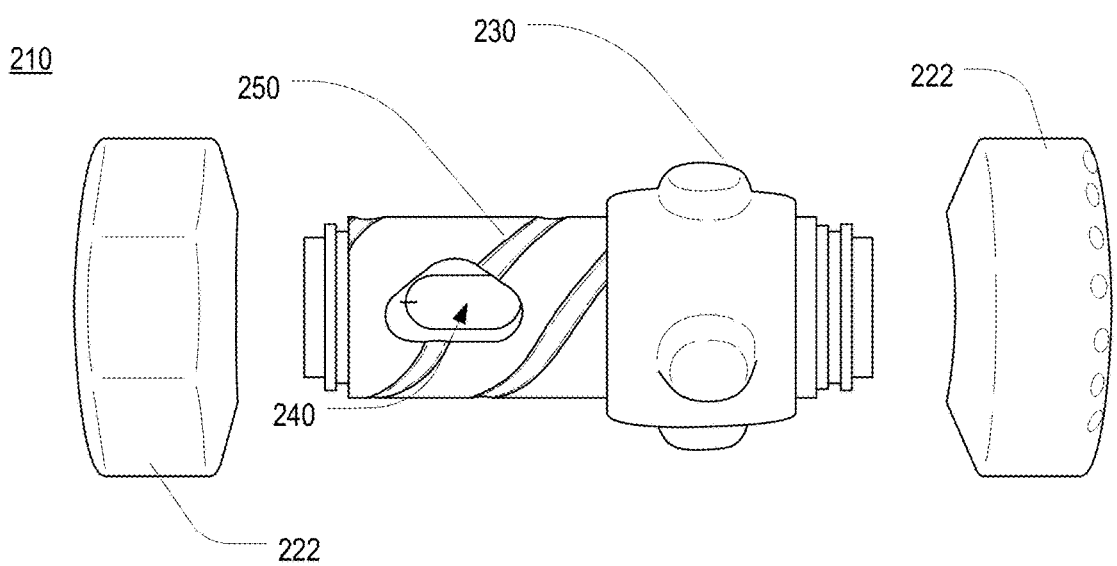
FIG. 9 is a front exploded view of the barbell-shaped animal-operated puzzle and treat toy of FIG. 8.

FIG. 8 is a perspective view of a multi-skill barbell-shaped animal-operated puzzle and treat toy 210 in accordance with a third preferred embodiment of the present invention, and FIG. 9 is a front exploded view of the barbell-shaped animal-operated puzzle and treat toy 210 of FIG. 8. As shown therein, the animal-operated puzzle and treat toy 210 includes an elongated body 220, with barbell ends 222, and a surrounding manipulator element 230. The body 220 includes an aperture 240 and one or more storage portions 250 containing treat cavities. In this embodiment, one or both barbell ends 222 may be removable to provide access to the one or more treat cavities in the storage portions 250, thereby serving as lids. For example, in the embodiment illustrated in FIGS. 8 and 9, two separate storage portions 250 may be provided, one at each end of the elongated body 220, with one or more aperture 240 situated so as to provide access to the treat cavity arranged therein, and a respective barbell end 222 being removable to provide access to such treat cavity.

In use, the manipulator element 230 is arranged to translate along the elongated body 220 such that at least one aperture 240 is exposed. In at least some embodiments, the size and shape of the elongated body 220 is generally uniform, the size and shape of the internal surfaces of the manipulator element 230 are similarly uniform and correspond to the size and shape of the elongated body. 220. For example, in the embodiment illustrated in FIGS. 8 and 9, the elongated body 220 is cylindrical and the manipulator element is internally cylindrical to permit such translation. However, other cross-sectional shapes are likewise possible. Furthermore, the size of the elongated body 220 may vary slightly along its length (such as becoming thicker toward one end) such that additional effort is required to translate the manipulator element 230 along the body 220 to expose an aperture 240. Still further, in at least some embodiments, the internal surfaces of the manipulator element 230 may be provided with structures to engage with corresponding structures on the elongated body 220. For example, threaded grooves may be provided in the surface of the elongated body 220, and corresponding threaded structures may be provided on the internal surfaces of the manipulator 230 such that the manipulator element 230 must be rotated around the elongated body 220 in order to cause the manipulator element 230 to translate relative to the body 220.

In at least some embodiments, knobs or other structures may be provided on the outer surfaces of the manipulator element 230 to provide gripping and/or biting surfaces for an animal 80 so as to better control and effectuate movement of the manipulator element 230. Similarly, in at least some embodiments, bumps or other structures may be provided on the outer surfaces of the barbell ends 222 to provide gripping and/or biting surfaces for an animal 80 so as to better control and effectuate movement of the barbell ends 222. Also, in at least some embodiments, the manipulator element 230 may be penetrated by one or more aperture (not shown) that must be aligned with an aperture 240 in the elongated body 220 in order to provide an access opening through which items in the treat cavity may be accessed. Such a feature may also be incorporated into other embodiments of the present invention. Furthermore, use of a manipulator element that may be rotated around a body that includes a storage container until corresponding apertures in the manipulator element and the body (with or without lateral translation of the manipulator element relative to the body) may likewise be incorporated into other embodiments of the present invention.

A puzzle and toy of the type shown in FIGS. 8 and 9 may also incorporate features to provide a plurality of skill levels or challenges. For example, as shown therein, the elongated body 220 is provided with apertures 240 at different points along its length. Such an arrangement may include sequential apertures 240 that must be exposed (or aligned with an aperture in the manipulator element) to create the access opening, wherein greater translation of the manipulator element is required to create all of the access openings. Such an arrangement may additionally or alternatively include apertures of more than one different size to permit easier or more difficult access. Other arrangements for creating a plurality of challenges and/or challenges requiring different amounts of skill and/or diligence are also possible.

Figures 10, 11:
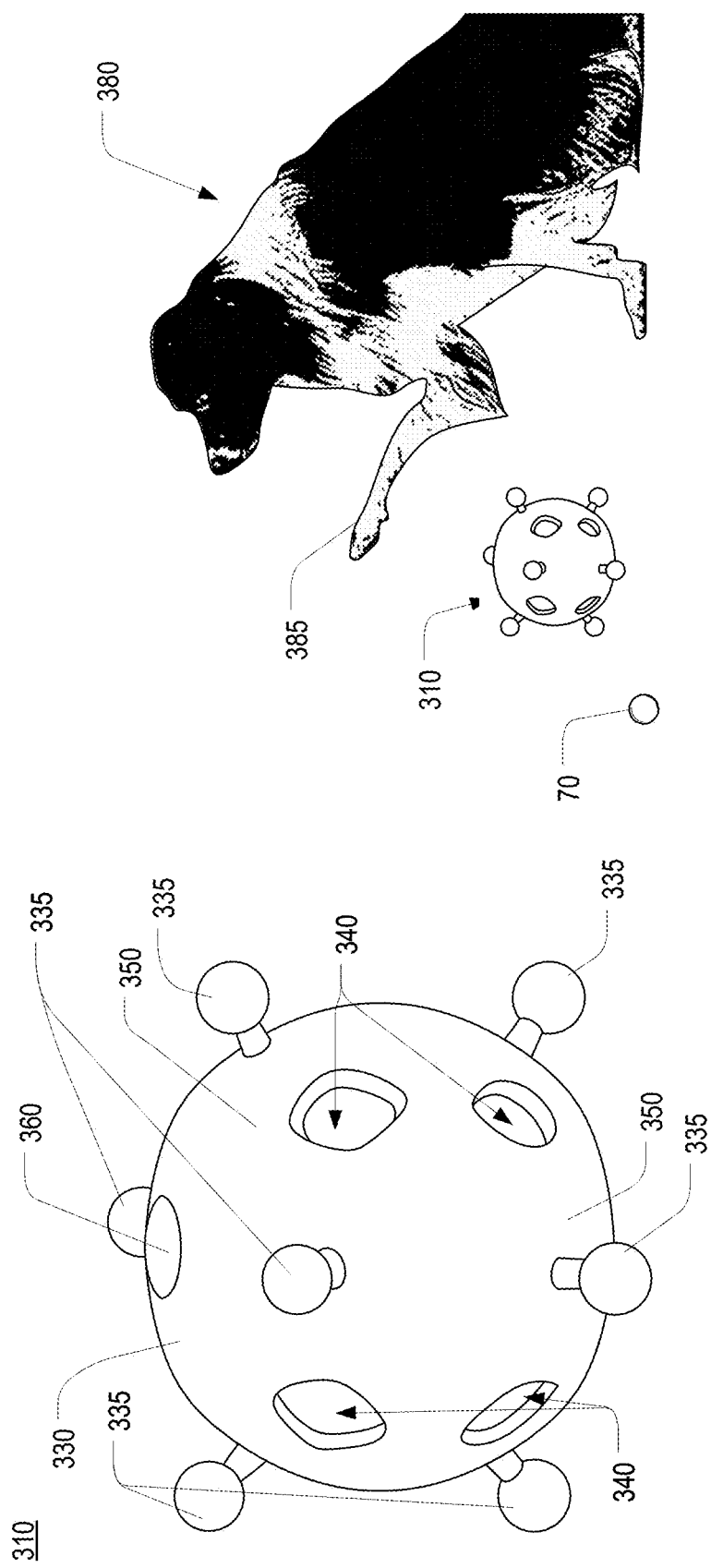
FIG. 10 is a front perspective view of a sphere-shaped animal-operated puzzle and treat toy in accordance with a fourth preferred embodiment of the present invention.
FIG. 11 is an illustration of an animal manipulating the sphere-shaped, animal-operated puzzle and treat toy of FIG. 10.
Figure 12:
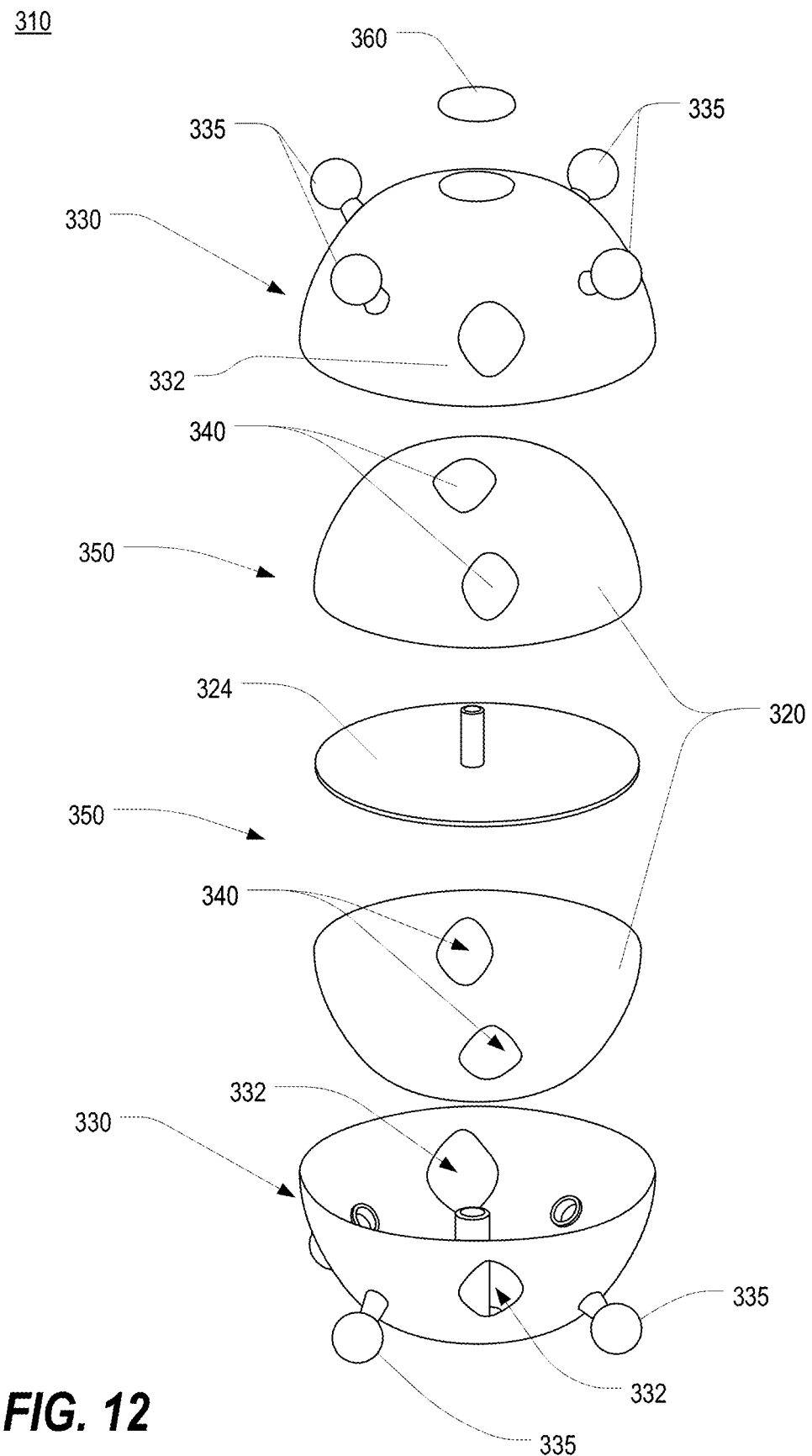
FIG. 12 is an exploded perspective view of the puzzle and treat toy of FIG. 10.

FIG. 10 is a front perspective view of a sphere-shaped animal-operated puzzle and treat toy 310 in accordance with a fourth preferred embodiment of the present invention; FIG. 11 is an illustration of an animal 380 manipulating the puzzle and treat toy 310 of FIG. 10, and FIG. 12 is an exploded perspective view of the puzzle and treat toy 310 of FIG. 10. As shown therein, this puzzle and treat toy 310 includes a generally spherical internal body 320, a rotational assembly 324, and a generally spherical manipulator assembly 330. The generally spherical internal body 320 is comprised of a pair of generally hemispherical body halves, each including one or more apertures 340. The generally spherical manipulator assembly 330 includes a pair of generally hemispherical body halves, each also including one or more apertures 332.

A rotational assembly may be implanted in a variety of ways, but in the illustrated embodiment, the rotational assembly 324 includes a center partition from which extends a pair of spindles (one shown) that mate with coaxial spindles (one shown) in the interiors of the hemispherical body halves of the manipulator assembly 330 such that the hemispherical body halves of the manipulator assembly can rotate on an axis around the internal body 320. In some embodiments, access to the spindles and/or to a central fastener (such as a long bolt or the like) may be provided via a small cover 360. In some embodiments, rotation of each hemispherical body half of the manipulator assembly 330 is independent from the other; in other embodiments, the hemispherical body halves of the manipulator assembly 330 rotate in unison with one another.

In the illustrated embodiment, the center partition of the rotational assembly 324 defines two separate treat cavities, where each hemispherical body half of the body 320 comprises a separate storage portion 350. However, in other embodiments, a single treat cavity is provided. For example, the center partition of the rotational assembly may be replaced or, in some circumstances, omitted.

With particular reference to FIGS. 10 and 12, the sphere-shaped manipulator element 330 rotates to cover or uncover the various apertures 340 in the body 320. As shown therein, the halves of the manipulator element 330 may be provided with handles or grasping members 335 to make it easier for the animal 380 to interact with the toy 310. Other surface features, including knobs, dimples, grooves, and the like, may additionally or alternatively be provided on the manipulator element 330. When the animal 80 rotates the sphere manipulator 330 relative to the body 320, using the handles or grasping members 335 or otherwise, the apertures 332 of the manipulator element 330 may become aligned with the apertures 340 of the body, thereby providing an access opening to the treat cavity.

A puzzle and toy of the type shown in FIGS. 10-12 may also incorporate features to provide a plurality of skill levels or challenges. In one example, the body 320, the manipulator element 330, or both may be provided with apertures at different points such that one or more apertures 340 in the body 320 may be aligned with one or more apertures 332 in the manipulator element 330 in different ways. In another example, aligning an aperture 340 in the body 320 with an aperture 332 in the manipulator element 330 in the top half of the toy 310 does not result in alignment of an aperture 340 in the body 320 with an aperture 332 in the manipulator element 330 in the bottom half of the toy 310. In another example, apertures of more than one different size are provided to permit easier or more difficult access. Other arrangements for creating a plurality of challenges and/or challenges requiring different amounts of skill and/or diligence are also possible.

In various embodiments, a manipulator element can be of any shape which can function for the purposes described herein. As described and illustrated herein, a manipulator element can have a plurality of apertures of different sizes. As the manipulator element is moved, the differently-sized apertures of the manipulator element are aligned with the body apertures in various ways, providing various solutions to the puzzle and thus various ways for the animal to access the food treats 70 or other reward items. In somewhat like manner, a puzzle and treat toy body may have a plurality of apertures of different sizes. As the manipulator element is moved, the aperture of the manipulator element is aligned with the differently-sized apertures of the body in various ways, providing various solutions to the puzzle and thus various ways for the animal to access the food treats 70 or other reward items.

Figure 13:
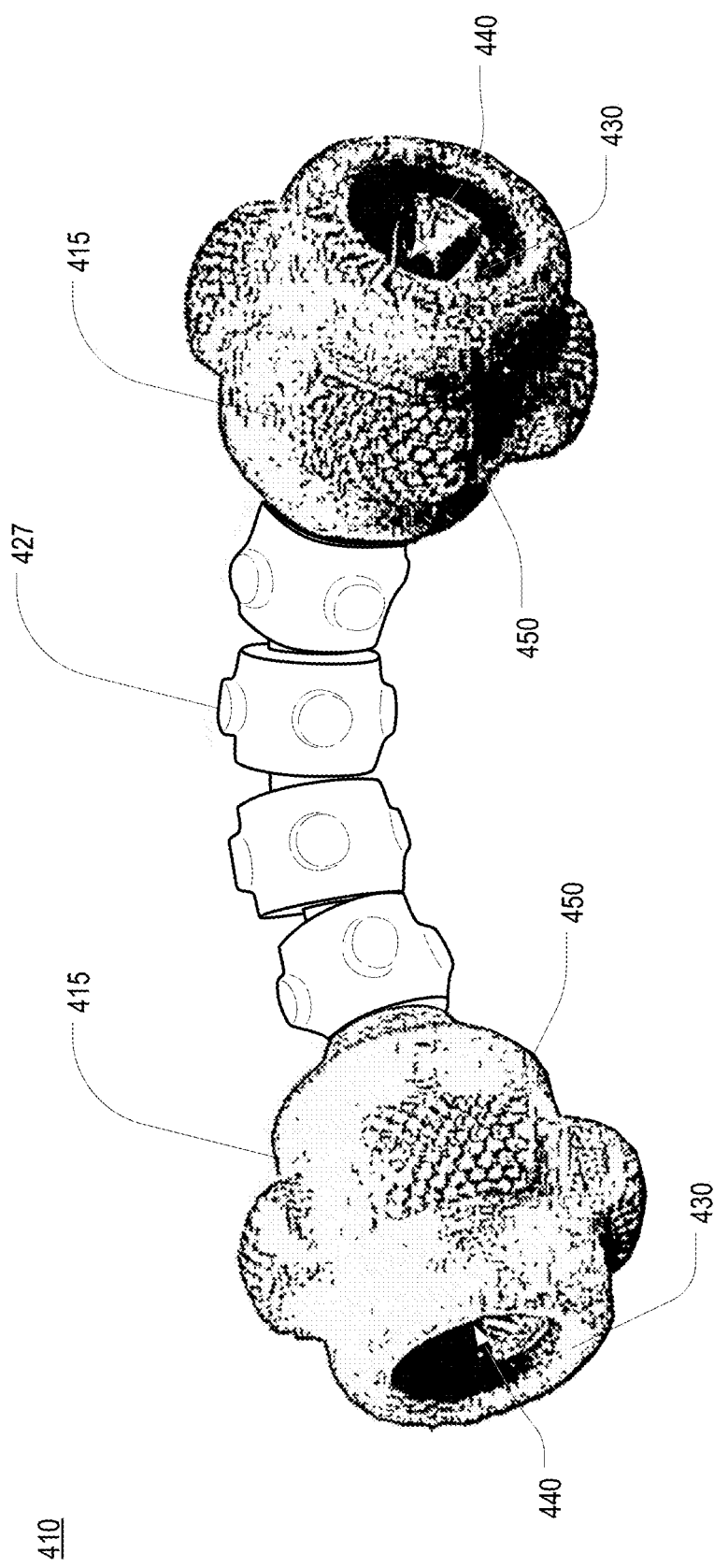
FIG. 13 is a perspective view of an animal-operated puzzle and treat toy in accordance with a fifth preferred embodiment of the present invention.
Figure 14A:
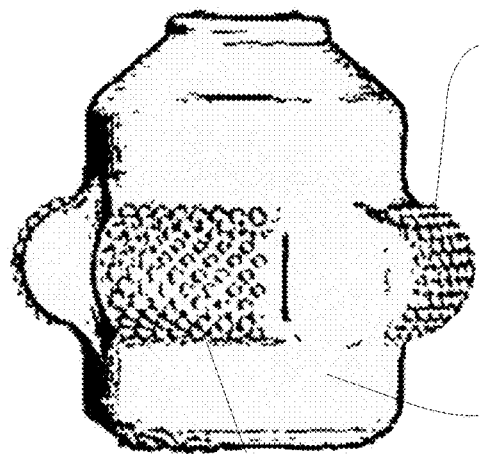
FIG. 14A is a side view of the end element of the animal-operated puzzle and treat toy of FIG. 13.
Figure 14B:
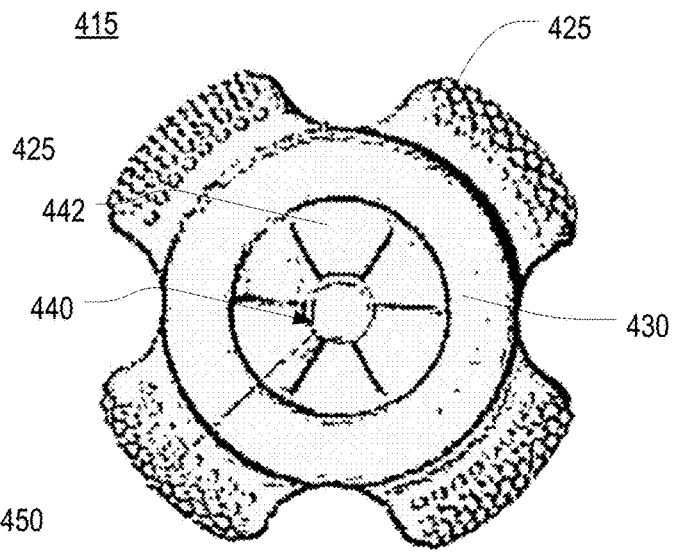
FIG. 14B is a end view of the end element of the animal-operated puzzle and treat toy of FIG. 13.
Figure 14C:
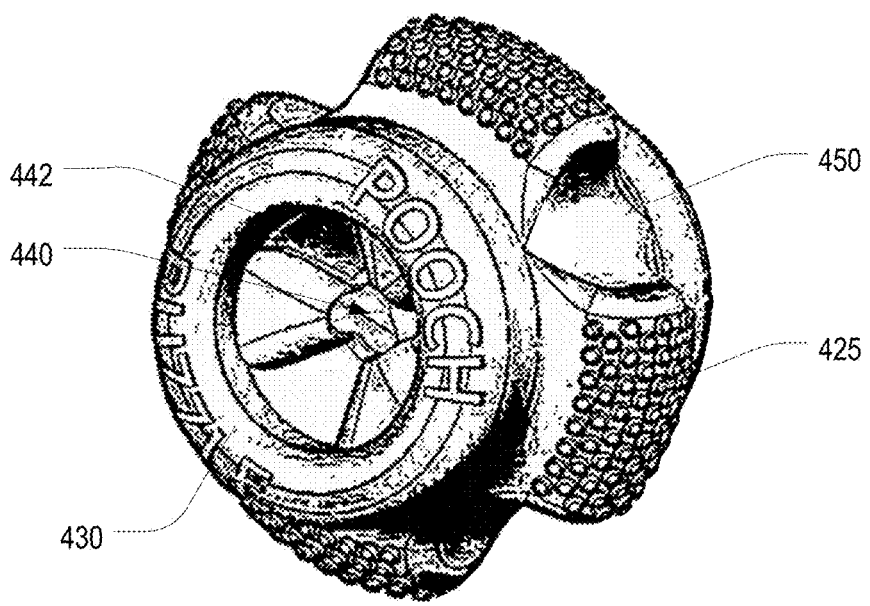
FIG. 14C is a perspective view of the end element of the animal-operated puzzle and treat toy of FIG. 13.
Figure 15:
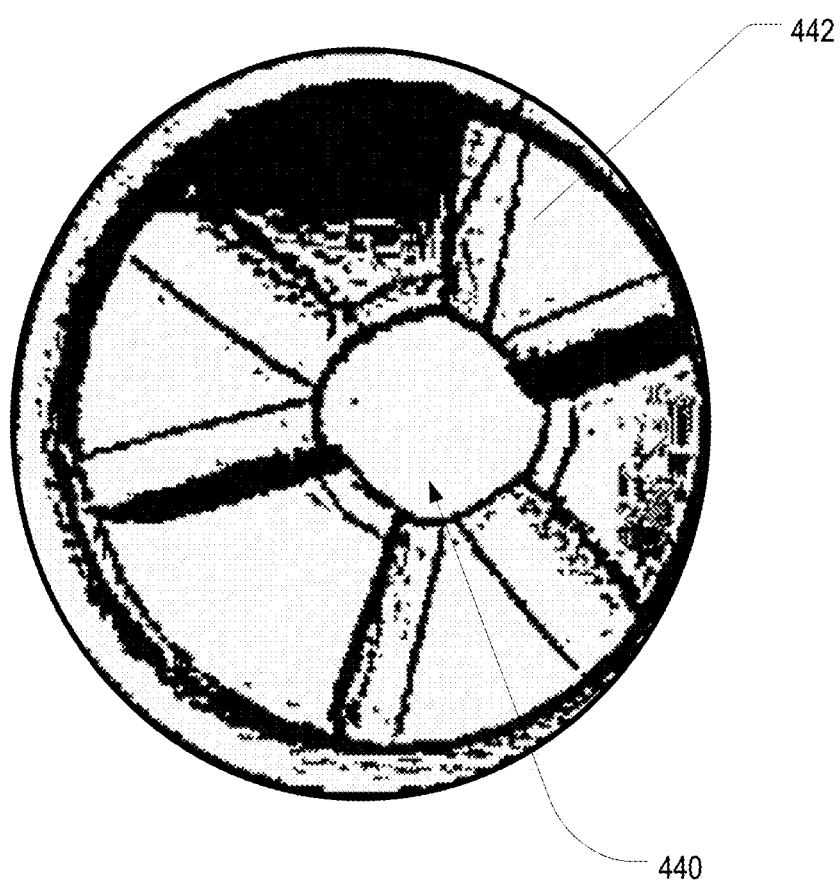
FIG. 15 is an enlarged view of the aperture of one of the end elements of the puzzle and treat toy of FIG. 13.

In some embodiments of the present invention, a manipulator element may be incorporated into a body. For example, FIG. 13 is a perspective view of an animal-operated puzzle and treat toy 410 in accordance with a fifth preferred embodiment of the present invention. In this embodiment, the toy 410 includes two end elements 415 connected by a flexible connector 427. FIGS. 14A-14C are a side view, an end view, and a perspective view of an end element 415 of the animal-operated puzzle and treat toy 410 of FIG. 13. As perhaps best shown in FIG. 14C, each end element 415 includes a body, including a storage portion 450, and an integrated manipulator element 430. The manipulator element 430 includes an aperture 440 defined by a plurality of flexible pleats 442. In this regard, FIG. 15 is an enlarged view of the aperture of one of the end elements 415 of the puzzle and treat toy 410 of FIG. 13. The top surfaces of the pleat 442 are used to change the aperture size thus making it possible to access the treat cavity in the storage portion 450.

Figure 16:
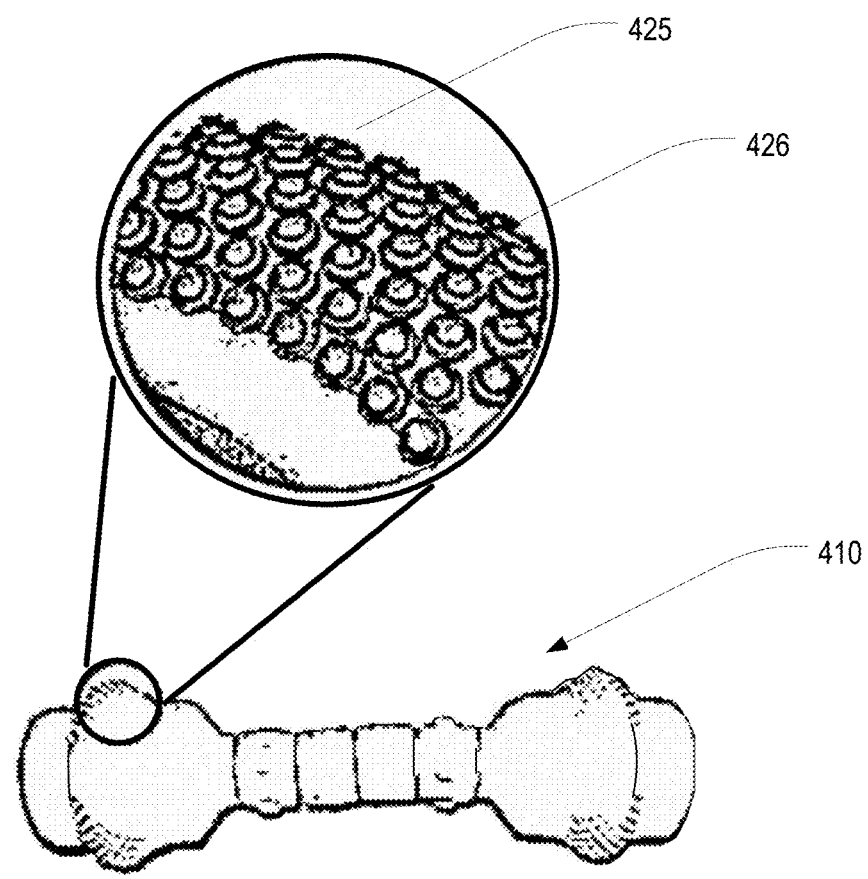
FIG. 16 is a detailed view of dental dimple clusters used on multiple embodiments of the present invention.
Figure 17:
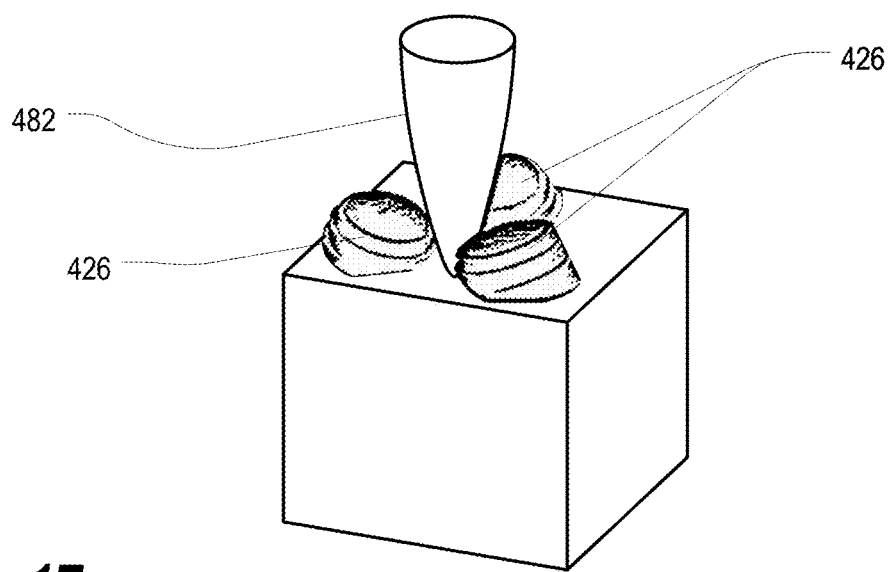
FIG. 17 is a detailed view of an animal tooth interacting with the dental dimples of FIG. 16.
Figure 18:
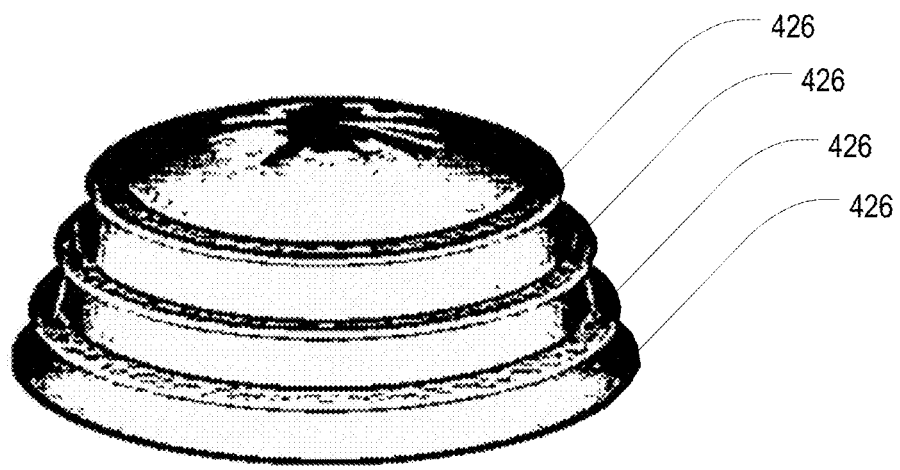
FIG. 18 is a perspective view of a single dental dimple.
Figure 19:
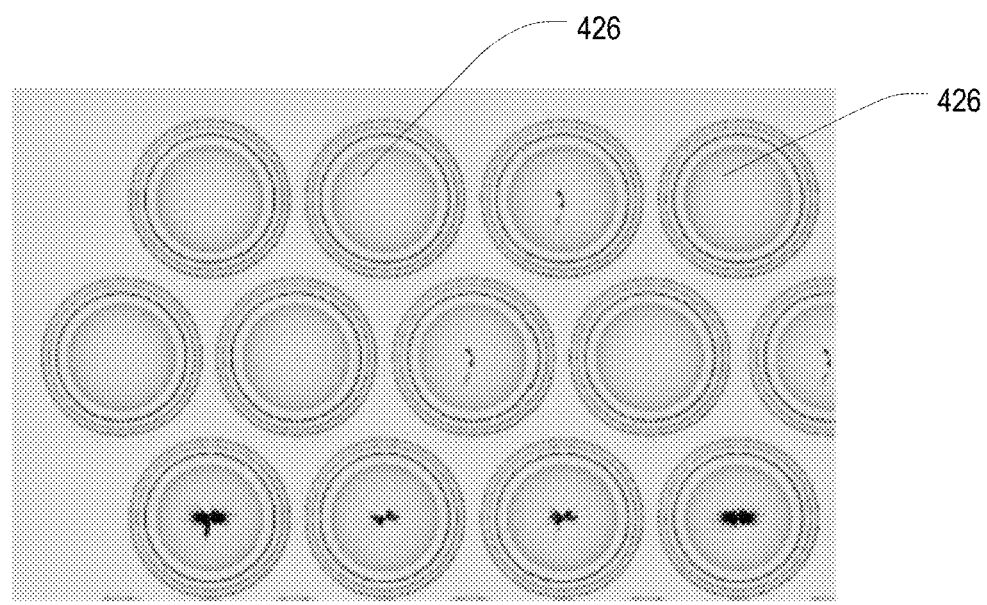
FIG. 19 is a top view of dental dimples.

In some embodiments, such as the embodiment of FIG. 13, the exterior of the body of each end element 415 can be surfaced with dental dimples 425. Dental dimples 425 are a cluster of raised three dimensional shapes that have recesses, grooves, or other "dimples" formed therebetween to aid in scraping tooth surfaces. Such structures can be a part of the surface of the body 415 of a treat toy 410, as shown in FIG. 16, or may incorporated into bodies and/or manipulator elements of various other puzzle and treat toys. The dental dimple clusters 425 provide a tooth cleaning mechanism for an animal who grasps the treat toy 410 with their teeth. In the embodiment shown in FIGS. 17-19, the dental dimple cluster 425 has disks 426 located on the exterior surface of the three dimensional shape, which may be a puzzle and treat toy body, manipulator element, or the like. The body 415 of the toy 410 may be dome-shaped, as perhaps best shown in FIG. 18, or may be any other shape which may be clustered together in order to form a dimple therebetween. These shapes may include hexangular shapes, cube shapes, cylindrical shape, pyramidal shapes, or the like. As shown in FIG. 17, the disks 426 scrape the tooth 482 when the tooth comes in contact with the dental dimples 425. As the dental dimples 425 scrape the tooth 482 with the disks 426, plaque, debris, and the like is removed, thereby cleaning the tooth.

Figure 20:
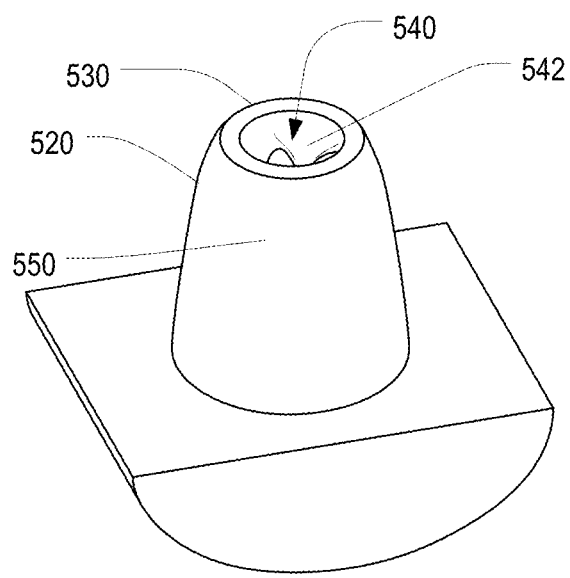
FIG. 20 is a perspective view of an animal-operated puzzle and treat toy in accordance with sixth preferred embodiment of the present invention.
Figure 21:
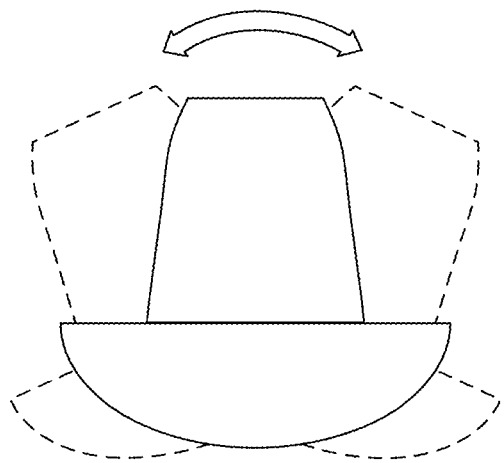
FIG. 21 is a side view of the puzzle and treat toy of FIG. 20, wobbling side to side.
Figure 22:
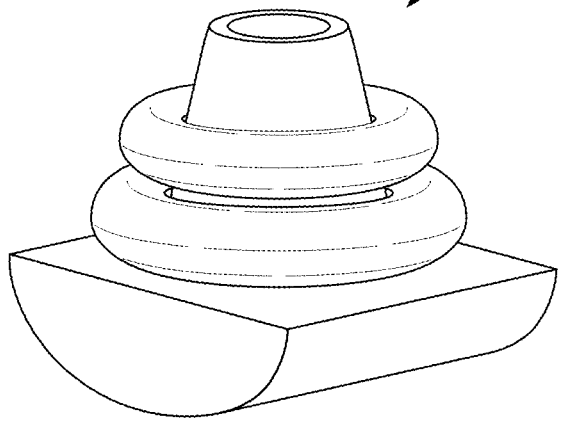
FIG. 22 is a perspective view of the animal-operated puzzle and treat toy of FIG. 20 with rings mounted on the toy.

FIG. 20 is a perspective view of an animal-operated puzzle and treat toy 510 in accordance with sixth preferred embodiment of the present invention, while FIG. 21 is a side view of the puzzle and treat toy 510 of FIG. 20, shown wobbling side to side, and FIG. 22 is a perspective view of the animal-operated puzzle and treat toy 510 of FIG. 20 with rings mounted on the toy. In addition to having a main body 520 that includes a storage portion 550 defining a treat cavity, the treat toy 510 of FIG. 20 has a similar manipulator element 530 and aperture 540 to manipulator element 430 and apertures 440 of the treat toy 410 of FIG. 13, where top surfaces of pleats 542 may be manipulated to change the aperture size, thus providing access to the treat cavity of the toy 510.

Figure 23:
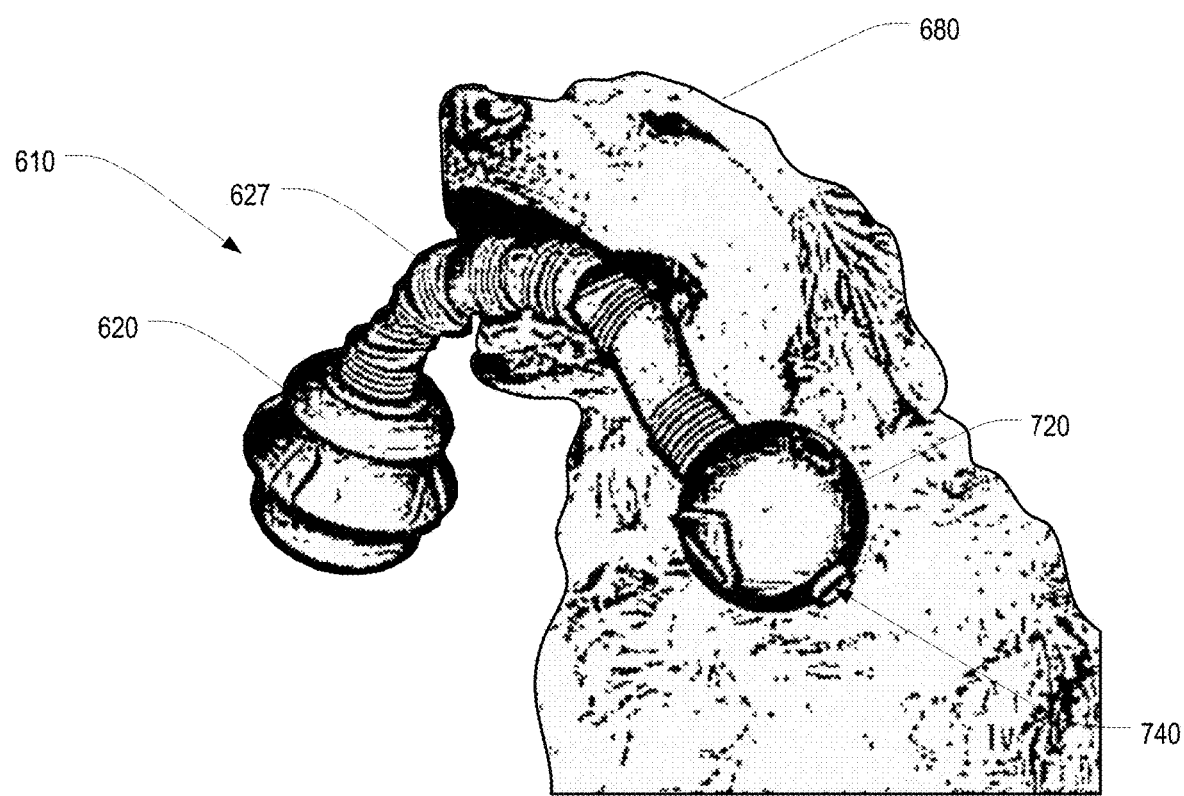
FIG. 23 is an animal-operated puzzle and treat toy in accordance with another embodiment of the present invention being held by an animal.

FIG. 23 is an animal-operated puzzle and treat toy 610 in accordance with a seventh preferred embodiment of the present invention being held by an animal 680. This embodiment demonstrates a treat toy 610 where two (or more) similar or different bodies 620,720 can be connected together in a semi-permanent or permanent manner with a flexible connector 627. An aperture 740 that may be similar to the apertures 440,540 of FIGS. 13 and 20 may be provided. In variations of this embodiment, one or both illustrated bodies 620,720 may be replaced by other bodies, including other bodies disclosed herein.

Figure 24:
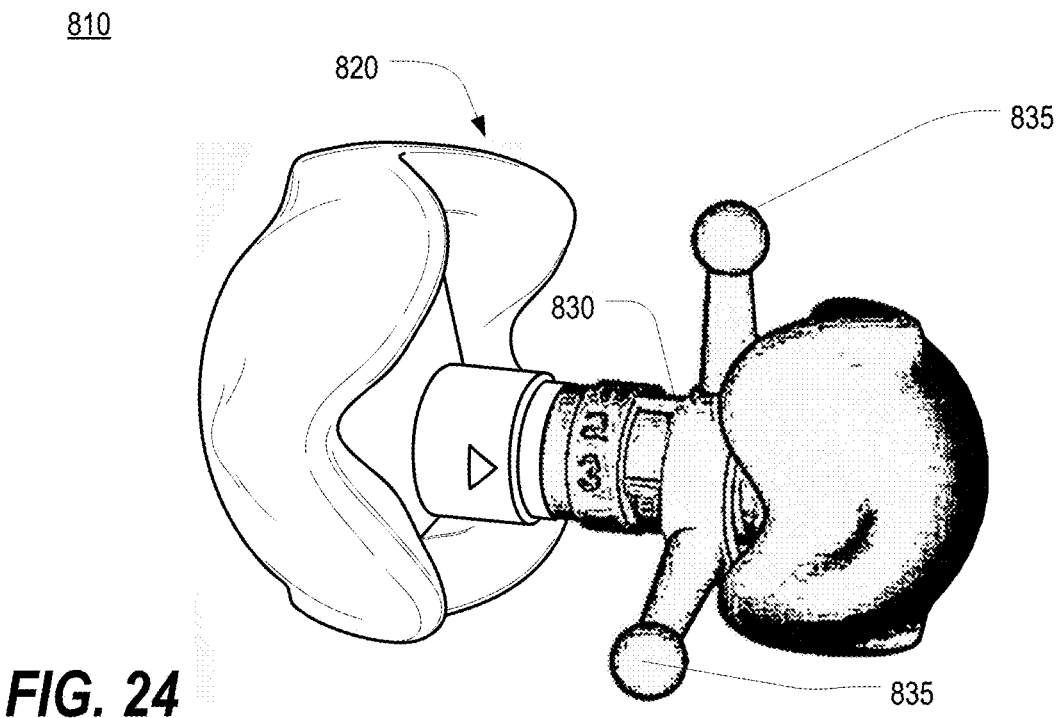
FIG. 24 is perspective view of an animal-operated puzzle and treat toy in accordance with another embodiment of the present invention.
Figure 25:
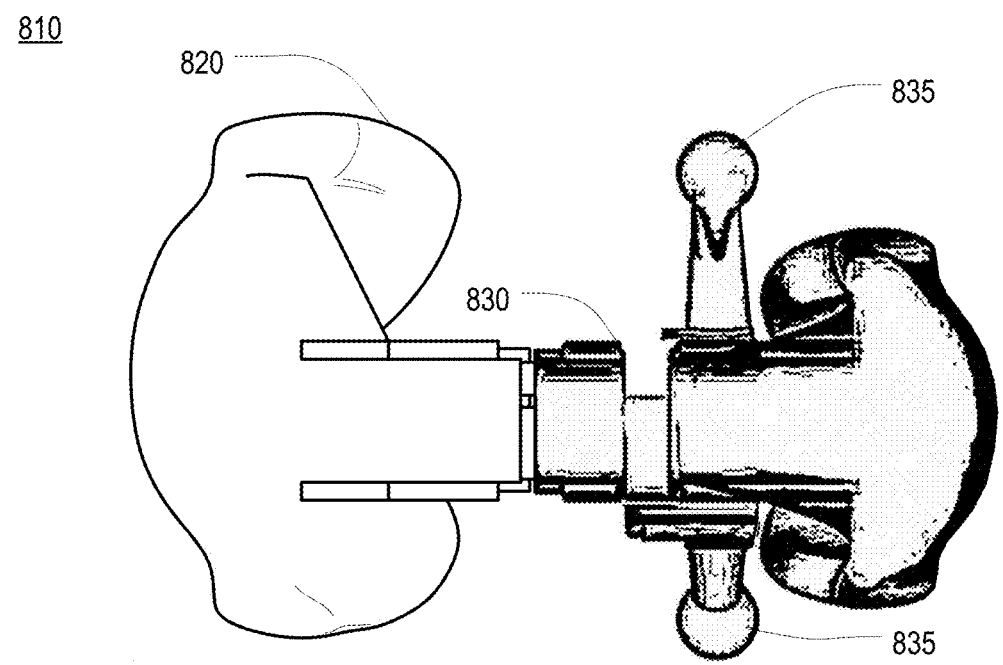
FIG. 25 is a cross-sectional side view of the animal-operated puzzle and treat toy of FIG. 24.

FIG. 24 is perspective view of an animal-operated puzzle and treat toy 810 in accordance with an eighth preferred embodiment of the present invention and FIG. 25 is a cross-sectional side view of the animal-operated puzzle and treat toy 810 of FIG. 24. Similar to the other embodiments, this puzzle and treat toy 810 has a body 820 and a manipulator element 830. The manipulator element 830 has knobbed grasping members 835 for an animal to manipulate with their mouth 82 and/or paws 85.

To use an animal-operated puzzle and treat toy, a human user (such as a "pet parent") takes the respective toy 10,110,210,310,410,510,610 and fills the treat cavity of each desired storage portion 50,150,250,350,450,550,650 with food treats 70 or other reward items by placing the items in a treat cavity. This filling of the treat cavity occurs either by the user directly placing the items into a treat cavity via the aperture 40,240,340,440,540,740, or by removing a lid (such as the representative lid 160 of FIG. 4) which opens the body 20,120,220,320,420,520,620,720 of the toy in order to directly access the treat cavity. Once the treat cavity is filled with food treats 70 or other reward items, and/or in some embodiments before the treat cavity is filled, the human user may then, in at least some embodiments, set the skill level of the puzzle toy. In some embodiments, the skill level is set by choosing which treat cavity, of a plurality of treat cavities, to fill, wherein the difficulty of accessing the food treats 70 or other reward items in each different treat cavity is different because of aperture size, the number of available apertures, or the like. In some embodiments, the skill level is set by positioning a manipulator element in a particular position or state, wherein more movement, more difficult movement, and/or the like is required in one particular position than another particular position, thus making it more difficult to access the food treats 70 or other reward items. In some embodiments, the available skill levels may range from easy to medium to advanced.

Once filled and the difficulty level set, the treat toy 10,110,210,310,410,510,610 may be used directly or presented to an animal 80 with the intent that the animal must solve the puzzle by using the manipulator element 30,130, 230,330 or manipulating the aperture 440,540 in order to access the food treat 70 or other reward item contained within the body and treat cavity. Using any method available, the animal moves the manipulator to align apertures, enlarge an aperture, or otherwise create an access opening in order to access the food treat 70 or other reward item inside the treat cavity. Once the animal has changed the diameter of the aperture to a sufficient diameter to access the treat cavity, the animal may access and remove the food treat 70 or other item contained in the treat cavity.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

The multi-skill level animal-operated puzzle and treat toys of the present invention enable an animal to be able to play with a puzzle that rewards them while learning different skill levels. Advantageously, in various embodiments, a multi-skill level animal-operated puzzle and treat toy is provided that has different skill levels such that the animal can play with a puzzle that rewards them while learning. In one or more methods of use, the present invention teaches animal how to move and manipulate parts or objects and be rewarded by a food treat when puzzle parts of the present invention are manipulated in a manner which allows access and or dispensing of the food treat contained in a treat cavity. In various embodiments, a manipulator element can have variable aperture areas, where as the manipulator element is moved and operated, the variable areas of the manipulator element are aligned up with an aperture in various ways, providing various solutions to the puzzle and ability for the animal to access the food treats. Therefore, the animal has learned how to obtain food by turning the manipulator element and/or solving the puzzle. Also advantageously, in various embodiments, a multi-skill level animal-operated puzzle and treat toy is provided that redirects potentially destructive chewing behavior with unique learning activities. In some such embodiments, as the animal bites the puzzle and treat toy with its teeth, dental dimples or other structures scrape a tooth to clean the tooth of debris, plaque or other matter. Other teaching, training, and learning methods and advantages deriving from the present invention will likewise be apparent to one of ordinary skill in the art.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method of inducing learning in an animal via an animal-operated puzzle and treat toy, comprising:
   (a) by a human, positioning a food treat or other reward item in an animal-operated puzzle and treat toy having:
      (i) a body, including a storage portion having one or more walls defining a treat cavity inside the storage portion, wherein the body has a front, a rear, a top, a bottom, and two opposed ends, wherein the body further includes first and second apertures penetrating through the one or more walls to the treat cavity, and wherein the first aperture is located in the front of the body and the second aperture is located in the rear of the body, and
      (ii) an animal-operable manipulator element, connected to the body, that is translatable relative to the body to provide access from an external environment to the treat cavity via the first and second apertures, wherein the first and second apertures are large enough such that the food treat or other reward item may be released through the apertures to the environment,
      (iii) wherein the food treat or other reward item is positioned by the human in the treat cavity;
   (b) by the human, placing the animal-operated puzzle and treat toy in an initial state, wherein the manipulator element blocks the food treat or other reward item from being released from the treat cavity;
(c) by the human, providing the animal-operated puzzle and treat toy, in the initial state, to an animal;
(d) by the animal, translating the manipulator element, relative to the body, to an adjusted state such that at least one of the first and second apertures is exposed and access to the treat cavity is provided; and
(e) by the animal, further manipulating the animal-operated puzzle and treat toy such that the food treat or other reward item is released through at least one of the first and second apertures to the external environment.

2. The method of claim 1, wherein in the initial state, the manipulator element blocks the aperture, and wherein in the adjusted state, the manipulator element does not block the aperture.

3. The method of claim 1, wherein the manipulator element is connected to the body such that the manipulator element may be translated laterally relative to the body to provide the access.

4. The method of claim 3, wherein the body is an elongated body, and wherein the manipulator element is connected to the body such that the manipulator element may be translated along a length of the elongated body to provide access to the aperture.

5. The method of claim 1, wherein the manipulator element is retained on the body such that the manipulator element can be translated relative to the body by the animal but cannot be removed from the body by the animal.

6. The method of claim 1, wherein the one or more walls of the body have a circular cross-section, wherein the manipulator element has a circular interior, and wherein the manipulator element is connected to the body such that the manipulator element may be rotated around the circular body to provide access to the aperture.

7. The method of claim 1, wherein the body is a tubular body.

8. The method of claim 1, wherein the first and second apertures are located directly opposite each other.

9. The method of claim 1, wherein the body has a length, and wherein each of the first and second apertures has a maximum diameter that is less than the length of the body.

10. A method of inducing learning in an animal via an animal-operated puzzle and treat toy, comprising:
(a) by a human, positioning a food treat or other reward item in an animal-operated puzzle and treat toy having:
(i) a body, including a storage portion having one or more walls defining a treat cavity inside the storage portion, wherein the body has a front, a rear, a top, a bottom, and two opposed ends, wherein the body further includes an aperture penetrating through the one or more walls to the treat cavity,
(ii) a respective barbell end disposed at each of the two opposed ends of the body, and
(ii) an animal-operable manipulator element, connected to the body, that is translatable relative to the body to provide access from an external environment to the treat cavity via the aperture, wherein the aperture is large enough such that the food treat or other reward item may be released through the aperture to the environment, and wherein translation of the manipulator element is limited by the location of the barbell ends,
(iii) wherein the food treat or other reward item is positioned by the human in the treat cavity;
(b) by the human, placing the animal-operated puzzle and treat toy in an initial state, wherein the manipulator element blocks the food treat or other reward item from being released from the treat cavity;
(c) by the human, providing the animal-operated puzzle and treat toy, in the initial state, to an animal;
(d) by the animal, translating the manipulator element, relative to the body, to an adjusted state such that the aperture is exposed and access to the treat cavity is provided; and
(e) by the animal, further manipulating the animal-operated puzzle and treat toy such that the food treat or other reward item is released through the aperture to the external environment.

11. The method of claim 10, wherein in the initial state, the manipulator element blocks the aperture, and wherein in the adjusted state, the manipulator element does not block the aperture.

12. The method of claim 10, wherein the manipulator element is connected to the body such that the manipulator element may be translated laterally relative to the body to provide the access.

13. The method of claim 12, wherein the body is an elongated body, and wherein the manipulator element is connected to the body such that the manipulator element may be translated along a length of the elongated body to provide access to the aperture.

14. The method of claim 10, wherein the manipulator element is retained on the body such that the manipulator element can be translated relative to the body by the animal but cannot be removed from the body by the animal.

15. The method of claim 10, wherein the one or more walls of the body have a circular cross-section, wherein the manipulator element has a circular interior, and wherein the manipulator element is connected to the body such that the manipulator element may be rotated around the circular body to provide access to the aperture.

16. The method of claim 10, wherein the aperture is a first aperture, wherein the body further includes a second aperture, and wherein the second aperture is located on a directly opposing side of the body from the first aperture.

17. The method of claim 10, wherein the body has a length, and wherein the aperture has a maximum diameter that is less than the length of the body.

18. An animal-operated puzzle and treat toy, comprising:
(a) a body, including a storage portion having one or more walls defining a treat cavity inside the storage portion, wherein the body has a front, a rear, a top, a bottom, and two opposed ends, wherein the body further includes first and second apertures penetrating through the one or more walls to the treat cavity, and wherein the first aperture is located in the front of the body and the second aperture is located in the rear of the body;
(b) a respective barbell end disposed at each of the two opposed ends of the body;
(c) an animal-operable manipulator element, connected to the body, that is translatable relative to the body to provide access from an external environment to the treat cavity via the first and second apertures, wherein the first and second apertures are large enough such that the food treat or other reward item may be released through the apertures to the environment, and wherein translation of the manipulator element is limited by the location of the barbell ends;
(d) wherein:
(i) a food treat or other reward item may be positioned in the treat cavity and the animal-operated puzzle and treat toy may be placed in an initial state wherein the manipulator element blocks the food treat or other reward item from being released from the treat cavity, and (ii) the manipulator element may be translated, relative to the body, by an animal, to an adjusted state such that the at least one of the first and second apertures is exposed and access to the treat cavity is provided, and (iii) the animal-operated puzzle and treat toy may be further manipulated by the animal such that the food treat or other reward item is released through at least one of the first and second apertures to the external environment.

19. The animal-operated puzzle and treat toy of claim 18, wherein the first and second apertures are located directly opposite each other.

20. The method of claim 18, wherein the body has a length, and wherein each of the first and second apertures has a maximum diameter that is less than the length of the body.

* * * * *